United States Patent
Itagaki et al.

(10) Patent No.: US 7,511,091 B2
(45) Date of Patent: Mar. 31, 2009

(54) ADDITIVE FOR IMPARTING FLAME RETARDANCE WITH AN ORGANIC RESIN, FLAME RETARDANT RESIN COMPOSITION, AND ARTICLE MOLDED THEREFROM

(75) Inventors: Akinari Itagaki, Annaka (JP); Masaaki Yamaya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/806,941

(22) Filed: Jun. 5, 2007

(65) Prior Publication Data

US 2008/0108737 A1 May 8, 2008

(30) Foreign Application Priority Data

Jun. 6, 2006 (JP) ............... 2006-157082

(51) Int. Cl.
- *C08K 5/5415* (2006.01)
- *C08K 5/42* (2006.01)
- *C08G 77/28* (2006.01)

(52) U.S. Cl. ............ 524/268; 524/157; 524/262; 524/161; 528/25; 528/43

(58) Field of Classification Search ............ 524/172
See application file for complete search history.

(56) References Cited

U.S. PATENT DOCUMENTS

| | | | |
|---|---|---|---|
| 4,391,935 A | 7/1983 | Bialous et al. | |
| 5,061,745 A | 10/1991 | Wittmann et al. | |
| 5,204,394 A | 4/1993 | Gosens et al. | |
| 5,532,399 A * | 7/1996 | Hager et al. | 556/428 |
| 6,297,340 B1 * | 10/2001 | Tachikawa | 528/15 |
| 6,602,938 B1 * | 8/2003 | Iji et al. | 524/164 |

FOREIGN PATENT DOCUMENTS

| | | |
|---|---|---|
| EP | 0 691 321 A2 | 1/1996 |
| EP | 1 288 262 A2 | 3/2003 |
| JP | 51-045159 A | 4/1976 |
| JP | 2-032154 A | 2/1990 |
| JP | 2-115262 A | 4/1990 |
| JP | 6-73281 A | 3/1994 |
| JP | 11-172063 A | 6/1999 |
| JP | 2002-167499 A | 6/2002 |
| JP | 2003-064229 A | 3/2003 |
| JP | 2004-035587 A | 2/2004 |
| JP | 2004-155938 A | 6/2004 |

* cited by examiner

Primary Examiner—Marc S Zimmer
Assistant Examiner—John Uselding
(74) Attorney, Agent, or Firm—Birch, Stewart, Kolasch & Birch, LLP

(57) ABSTRACT

An additive for imparting flame retardancy with an organic resin is provided. This additive does not use environmentally harmful halogen or phosphorus flame retardant which also adversely affects the performance of the product, and this additive satisfies severe flame retardancy requirements at the level equivalent to those employing such flame retardants. Also provided are a flame retardant polycarbonate resin composition adapted for use in producing a product having excellent mechanical properties, moldability, and outer appearance as well as an article molded therefrom.

The additive for imparting flame retardancy with an organic resin comprises a silicone compound having phenyl group bonded to silicon atom, an alkali metal sulfonate salt group or an alkaline earth metal sulfonate salt group bonded to silicon atom via a hydrocarbon group (optionally containing a hetero atom), and siloxane bond.

13 Claims, No Drawings

ADDITIVE FOR IMPARTING FLAME RETARDANCE WITH AN ORGANIC RESIN, FLAME RETARDANT RESIN COMPOSITION, AND ARTICLE MOLDED THEREFROM

CROSS-REFERENCE TO RELATED APPLICATION

This non-provisional application claims priority under 35 U.S.C. §119(a) on Patent Application No. 2006-157082 filed in Japan on Jun. 6, 2006, the entire contents of which are hereby incorporated by reference.

TECHNICAL FIELD

This invention relates to an additive for imparting flame retardancy with an organic resin, a flame retardant resin composition, and an article molded from such composition. More specifically, this invention relates to an additive for imparting flame retardancy with an organic resin capable of realizing excellent flame retardancy which does not contain environmentally harmful halogen flame retardant or phosphorus flame retardant, and this invention also relates to a flame retardant polycarbonate resin composition adapted for use in producing various components in electric, electronic, and OA appliance which are required to have excellent mechanical properties including impact strength as well as good moldability and outer appearance, and which are also required to meet extremely strict flame retardancy standards. This invention also relates to an article molded from such composition.

BACKGROUND ART

Polycarbonate resins (hereinafter sometimes abbreviated as "PC") are widely used in various industrial fields including automobile, OA appliance, and electric and electronic products. However, there is a strong demand for improvement of the flame retardancy for the resin materials used in the applications including OA appliance, and electric and electronic products, and numerous flame retardants have been developed to fulfill such demands. The flame retardants used for the polycarbonate resin have mostly been bromine compounds which were optionally used with antimony trioxide. Such resin composition, however, generates bromine gas in the burning of the resin, and this invites environmental contamination. In view of such situation, use of a phosphorus flame retardant, for example, a phosphate ester simultaneously with or without the bromine compound has been recently reported as an attempt to reduce the amount of the bromine compound used. However, such phosphorus flame retardants has a drawback that it decomposes during its use inviting loss of the mechanical strength of the resin composition, and such phosphorus flame retardants could not completely solve the problem of environmental contamination.

With regard to such non-phosphorus flame retardant materials or non-phosphorus, non-bromine flame retardant materials, Patent Document 1 (JP-A 51-045159), for example, proposes a flame retardant polycarbonate resin composition comprising an organic acid salt such as sulfonate salt of an alkaline metal or alkaline earth metal, polytetrafluoroethylene, and an aromatic polycarbonate; Patent Document 2 (JP-A 06-073281) proposes a flame retardant polycarbonate resin composition comprising a polycarbonate, an alkali metal salt or an alkaline earth metal salt of a perfluoroalkanesulfonic acid, and epoxy resin; and Patent Document 3 (JP-A 2004-155938) proposes a flame retardant polycarbonate resin composition comprising a polycarbonate resin, a metal salt of an aromatic sulfur compound, a fiber-forming fluorine-containing polymer, and a polyorganosiloxane. These flame retardant polycarbonate resin compositions, however, did not exhibit the excellent transparency characteristic to the polycarbonate resin, and also suffered from the drawbacks including loss of melt thermal stability when the flame retardant is added at an amount sufficient for realizing the intended flame retardancy, yellowing and silvering of the molded article, and drastic decrease in the mechanical strength.

Patent Document 4 (JP-A 2003-064229) proposes a flame retardant resin composition comprising a metal sulfonate salt of styrene polymer in which an aromatic monomer unit having sulfonate group in the aromatic skeleton constitutes 15 to 45% by mole of the total monomer units, a styrene polymer having a content of the metal sulfate of up to 5% by weight, and a polycarbonate. This flame retardant resin composition suffered from insufficient thermal stability that invited yellowing of the composition as well as insufficient weatherability.

In the case of the polycarbonate resin compositions having incorporated therein a halogen-free, phosphorus-free flame retardant as described above, the compositions suffered from the drawback that the composition was insufficient in the flame retardancy, and when a flame retardant was incorporated at an amount sufficient for realizing the flame retardancy, the composition exhibited loss of the melt thermal stability and the molded article underwent yellowing and drastic loss of mechanical strength.

In the meanwhile, a number of polymer alloys with another thermoplastic resin have been developed to further improve and modify various properties of the polycarbonate resin. One such polycarbonate composition is the one prepared by blending a polycarbonate resin with a styrene/acrylonitrile graft copolymer such as ABS resin, and this material is widely used in the field of automobiles as well electric and electronic appliances because it is a thermoplastic resin material having excellent mechanical properties, flowability, and thermal properties. In the field where the flame retardancy is required, a flame retardant is blended in such composition. Exemplary halogen-free flame retardant materials having reduced environmental stress include a resin composition comprising a polycarbonate resin and an ABS resin having a phosphorus flame retardant incorporated therein (see for example, Patent Documents 5 and 6: JP-A 02-115262 and JP-A 02-032154). These materials, however, suffered from the problems such as decrease in the distortion temperature under load as well as generation of the mold deposit.

Patent Document 7 (JP-A 11-172063) proposes a resin composition comprising a polycarbonate resin and an ABS resin having a metal sulfonate salt of the polystyrene incorporated therein. However, when the metal sulfonate salt was incorporated at an amount sufficient for realizing the flame retardancy, impact strength and distortion temperature under load of the resin composition decreased, and the molded article exhibited insufficient outer appearance. Patent Document 8 (JP-A 2002-167499) proposes a flame retardant resin composition formed form a polymer comprising a polycarbonate resin, a styrene resin, silicon, boron, and oxygen which has skeleton substantially constituted from silicon-oxygen bond and boron-oxygen bond, and which has aromatic ring in its molecule. This resin composition, however, was insufficient in the flame retardancy and impact strength. Patent Document 9 (JP-A 2004-035587) proposes a flame retardant resin composition comprising an aromatic polycarbonate resin, a styrene resin, an organic alkali metal salt and/or organic alkaline earth metal salt, and a silicone compound having functional groups. This flame retardant resin composition was commercially unpractical due to the insufficient glossiness and insufficient tensile elongation at the welded portion.

As described above, the resin compositions comprising a polycarbonate resin, a styrene resin such as ABS, and a flame retardant have been insufficient in distortion temperature under load, impact strength, and weld strength, and exhibited mold deposit and unfavorable outer appearance, and, currently available flame retardant resin compositions have been unacceptable for use in commercial applications.

DISCLOSURE OF THE INVENTION

The present invention has been completed in view of the situation as described above, and an object of the present invention is to provide an additive for imparting flame retardancy with an organic resin which does not use the environmentally harmful halogen or phosphorus flame retardant which also adversely affects the performance of the product but which satisfies the severe flame retardancy requirements of the level equivalent to those employing such flame retardants. Another object of the present invention is to provide a flame retardant polycarbonate resin composition adapted for use in producing a product having excellent mechanical properties, moldability, and outer appearance as well as an article molded therefrom.

In order to realize the objects as described above, the inventors of the present invention made an intensive study and found that a resin composition produced by blending a polycarbonate resin or a polymer alloy of the polycarbonate resin and another thermoplastic resin with a small amount of a novel silicone compound having phenyl group, an alkali metal sulfonate salt group or an alkaline earth metal sulfonate salt group, and siloxane bond generates a large amount of carbide in the burning of the polycarbonate resin, and the thus formed carbide covers the surface of the burning resin to cause delay in the supply of the decomposed gas generated in the interior of the resin to the site of burning to thereby realize a high level flame retardancy.

The inventors also found that such silicone compound exhibits good dispersibility in the polycarbonate resin, and when such silicone compound is incorporated in a polycarbonate resin composition, the article produced by the curing of such composition has excellent mechanical strength and outer appearance. The present invention has been completed on the bases of such findings.

Accordingly, the present invention provides an additive for imparting flame retardancy with an organic resin comprising a silicone compound having phenyl group bonded to silicon atom, an alkali metal sulfonate salt group or an alkaline earth metal sulfonate salt group bonded to silicon atom via a hydrocarbon group (optionally containing a hetero atom), and siloxane bond.

The present invention also provides a flame retardant resin composition comprising 100 parts by weight of a resin comprising 50 to 100% by weight of a polycarbonate resin (A) and 0 to 50% by weight of a thermoplastic resin (B) other than the polycarbonate resin; and 0.01 to 5.0 parts by weight of an additive for imparting flame retardancy with an organic resin (C) comprising a silicone compound having phenyl group bonded to silicon atom, an alkali metal sulfonate salt group or an alkaline earth metal sulfonate salt group bonded to silicon atom via a hydrocarbon group (optionally containing a hetero atom), and siloxane bond.

EFFECTS OF THE INVENTION

The additive for imparting flame retardancy with an organic resin comprising a silicone compound according to the present invention is useful as a flame retardant for a thermoplastic resin, such as polycarbonate resin, silicone modified polycarbonate resin, polystyrene resin, acrylonitrile/butadiene/styrene (ABS) resin, polyphenylene ether resin, polyester resin, polyamide resin, polyethylene, polypropylene, polybutene, polysulfone, polylactic acid, polyvinyl acetate, ethylene-vinyl acetate copolymer, polymethyl methacrylate, polyoxyethylene, cellulose acetate, and cellulose nitrate. In particular, a flame retardant resin composition prepared by incorporating this additive for imparting flame retardancy with an organic resin in a polycarbonate resin or a polymer alloy of a polycarbonate resin and another thermoplastic resin, and an article molded therefrom do not use the environmentally harmful halogen or phosphorus flame retardant which also adversely affects the performance of the product but satisfy the severe flame retardancy requirements at the level equivalent to those employing such flame retardants. Such flame retardant resin and article molded therefrom are also excellent in mechanical properties such as impact strength, moldability, outer appearance, and thermal stability, and therefore, they are well adapted for use in various applications, and in particular, in the application of electric, electronic, OA components as well as application of precision components.

DESCRIPTION OF THE PREFERRED EMBODIMENTS

Next, the present invention is described in detail.

The additive for imparting flame retardancy with an organic resin of the present invention comprises a silicone compound having phenyl group bonded to the silicon atom, an alkali metal sulfonate salt group or an alkaline earth metal sulfonate salt group bonded to the silicon atom via a hydrocarbon group (optionally containing a hetero atom), and siloxane bond.

The silicone compound used is the one having phenyl group bonded to the silicon atom in the molecule in view of the dispersibility in the organic resin, and in particular, in a polycarbonate resin and capability of imparting the flame retardancy with such resin. Examples of the siloxane unit constituting the silicone compound include phenylsilsesquioxane unit and diphenylsiloxane. In view of imparting such properties, content of the phenyl group in relation to total organic groups bonded to the silicon atom in the molecule is preferably 20 to 90% by mole, and more preferably, 30 to 70% by mole.

The silicone compound used is also the one containing an alkali metal sulfonate salt group or an alkaline earth metal sulfonate salt group ($-SO_3M$ group) bonded to the silicon atom via a hydrocarbon group (optionally containing a hetero atom) in the molecule in view of the capability of imparting flame retardancy with the organic resin, and in particular, with a polycarbonate resin. In view of imparting such properties, content of the hydrocarbon group containing the alkali metal sulfonate salt group or the alkaline earth metal sulfonate salt group in relation to the total organic groups bonded to the silicon atom in the molecule is preferably 3 to 50% by mole, and more preferably, 5 to 40% by mole.

The metal atom M in the alkali metal sulfonate salt group or the alkaline earth metal sulfonate salt group (—SO$_3$M group) may be, for example, an alkali metal such as lithium, sodium, or potassium; or an alkaline earth metal such as magnesium, calcium, or barium. In view of providing the flame retardancy, the metal atom M is preferably sodium and/or potassium.

In this case, the alkali metal sulfonate salt group or the alkaline earth metal sulfonate salt group bonded to the silicon atom via the hydrocarbon group is, for example, an aryl group such as phenyl group, an alkenyl group such as vinyl group, allyl group, an alkyl group substituted with epoxy group, a halogenated alkyl group, or an alkyl group substituted with mercapto group bonded to an alkali metal or an alkaline earth metal sulfonate. The hydrocarbon group is preferably the one containing 1 to 18 carbon atoms, and in particular, the one containing 2 to 10 carbon atoms.

Exemplary organic groups other than the phenyl group or the hydrocarbon group having the alkali metal sulfonate salt group or the alkaline earth metal sulfonate salt group include unsubstituted monovalent hydrocarbon groups such as alkyl groups, alkenyl groups, aryl groups other than phenyl group, and aralkyl groups, and substituted monovalent hydrocarbon groups containing 1 to 18, and in particular, 1 to 10 carbon atoms. Also included are such monovalent hydrocarbon groups substituted with a halogen atom, epoxy group, mercapto group. Content of such groups is preferably 0 to 77% by mole, and in particular, 0 to 65% by mole in relation to the total organic groups bonded to the silicon atom in the molecule.

When the silicone compound of the present invention is used as the additive for imparting flame retardancy with an organic resin, the alkali metal sulfonate salt group or the alkaline earth metal sulfonate salt group in the molecule is assumed to promote formation of the carbide layer by accelerating thermal decomposition of the organic resin during the burning, and such action together with the synergetic actions such as coupling action by the phenyl group in the same molecule and formation of an inorganic flame retardant layer by the siloxane backbone promptly blocks supply of the oxygen to thereby extinguish fire and prevent dripping.

For an efficient realization of such effects, the silicone compound of the present invention should be a polymer having a siloxane bond and not a monomer compound, and in view of the capability of forming the flame retardant layer, the silicone compound is preferably a polymer having a branched structure.

In the silicone compound used in the present invention, the ratio of the tetrafunctional unit SiO$_2$, trifunctional unit RSiO$_{3/2}$, difunctional unit R$_2$SiO, and monofunctional unit R$_3$SiO$_{1/2}$ is preferably such that:

SiO$_2$ unit: 0 to 50% by mole, and in particular, 0 to 30% by mole,

RSiO$_{3/2}$ unit: 20 to 100% by mole, and in particular, 40 to 90% by mole,

R$_2$SiO unit: 0 to 80% by mole, and in particular, 10 to 60% by mole, and

R$_3$SiO$_{1/2}$ unit: 0 to 30% by mole, and in particular, 0 to 20% by mole.

In the formula, R represents the organic group as defined above.

Such silicone compound may be any silicone compound having a non-limited composition and structure, and use of a combination of two or more silicone compounds having different composition and structure is also acceptable. The production method used in producing such silicone composition is not particularly limited, and the silicone compound may be produced by a method known in the art.

For example, a silane having a structure corresponding to the target silicone compound or a precursor of such silane compound may be simultaneously hydrolyzed optionally in the presence of an appropriate organic solvent, and an alkali metal sulfonate salt group or an alkaline earth metal sulfonate salt group may be incorporated in the hydrolysate to thereby obtain the target product. Alternatively, when an alkoxysilane, a silicone oil, or a cyclic siloxane having an organic residue such as phenyl group, methyl group, vinyl group, glycidoxypropyl group, chloropropyl group, or mercaptopropyl group in the molecule is used for the starting material, an acid catalyst such as hydrochloric acid, sulfuric acid, or methanesulfonic acid may be used optionally by adding water for hydrolysis to thereby promote the polymerization, and an alkali metal sulfonate salt group or an alkaline earth metal sulfonate salt group may be thereafter introduced to obtain the intended product.

In such production method, the phenyl group which is a substituent critical in the silicone compound of the present invention can be introduced by using phenyltrichlorosilane, diphenyldichlorosilane, phenyltrimethoxysilane, diphenyldimethoxysilane, and the like for the starting material. In order to produce a compound having a branched structure, use of a trifunctional phenyl silane such as phenyltrichlorosilane or phenyltrimethoxysilane is preferable.

Exemplary methods used in introducing the alkali metal sulfonate salt group or the alkaline earth metal sulfonate salt group include (1) a method in which the phenyl group is sulfonated by sulfuric acid or anhydrous sulfuric acid, and neutralized by sodium hydroxide, potassium hydroxide, or the like to produce an alkali metal sulfonate salt; (2) a method in which an alkenyl group is turned into an alkali metal sulfonate salt by sodium hydrogen sulfite or potassium hydrogen sulfite; (3) a method in which epoxy group is turned into an alkali metal sulfonate salt by sodium hydrogen sulfite or potassium hydrogen sulfite; (4) a method in which a halogenated alkyl group is turned into an alkali metal sulfonate salt by sodium hydrogen sulfite or potassium hydrogen sulfite; and (5) a method in which mercapto group is sulfonated by hydrogen peroxide, and then neutralized by sodium hydroxide or potassium hydroxide to thereby produce an alkali metal sulfonate salt. In view of the reactivity and handling convenience, the preferred are the methods of (3) and (5), and the more preferable is the method of (5).

In the most preferable production method, a method may be employed in which a silane mixture comprising SiX$_4$: 0 to 50% by mole, and in particular, 0 to 30% by mole, R$^1$SiX$_3$: 20 to 100% by mole, and in particular, 40 to 90% by mole, R$^1_2$SiX$_2$: 0 to 80% by mole, and in particular, 10 to 60% by mole, and R$^1_3$SiX: 0 to 30% by mole, and in particular, 0 to 20% by mole, (wherein X is a halogen atom such as chlorine or a hydrolyzable group such as alkoxy group or acyloxy group; and R$^1$ independently represents phenyl group or an optionally substituted monovalent hydrocarbon group other than the phenyl group which constitutes the R as defined above after conversion of a part of the phenyl group and/or a part or all of the optionally substituted monovalent hydrocarbon group other than the phenyl group into the alkali metal or the alkaline earth metal sulfonate salt) is simultaneously hydrolyzed, condensed, and a part of the phenyl group and/or a part or all of the optionally substituted monovalent hydrocarbon group other than phenyl group is turned into an alkali metal or an alkaline earth metal sulfonate salt as described above.

In an exemplary embodiment, the production is conducted by dissolving a phenyl group-containing silane (for example, phenyltrimethoxysilane or diphenyldimethoxysilane), a mercapto group-containing silane (for example, mercaptopropyltrimethoxysilane or mercaptopropylmethyldimethoxysilane), and an optional silane other than such silanes (for example, methyltrimethoxysilane or dimethyldimethoxysilane) in a hydrophilic organic solvent such as methanol; adding a predetermined amount of aqueous solution of hydrogen peroxide dropwise for maturing to thereby oxidize mercapto group and produce sulfonate group; simultaneously conducting hydrolysis by water in the reaction system using the sulfonate group for the catalyst to produce a polymer having siloxane bond; neutralizing the sulfonate group by adding aqueous solution of sodium hydroxide or potassium hydroxide for substitution to thereby generate an alkali metal sulfonate salt group or an alkaline earth metal sulfonate salt group such as sodium sulfonate salt group or potassium sulfonate salt group. After the reaction, the low boiling content or the impurities are removed by the operation such as heating for removal by distillation, washing with water, or drying to produce the silicone compound containing 100% of the effective component. When the resulting product is a solid, the solid is preferably pulverized to obtain a product in the form of a fine powder. When the silicone compound is produced by such production method, the product may contain residual mercapto group or sulfonate group which failed to undergo the reaction in addition to the target alkali metal sulfonate salt group or the alkaline earth metal sulfonate salt group. Such presence of the functional groups, however, is acceptable as long as such presence does not adversely affect various properties of the flame retardant resin composition produced by adding such silicone compound to the organic resin as a flame retardant additive.

The silicone compound having phenyl group bonded to the silicon atom, an alkali metal sulfonate salt group or an alkaline earth metal sulfonate salt group bonded to the silicon atom via a hydrocarbon group (optionally containing a hetero atom), and siloxane bond of the present invention can be used as a flame retardant for various thermoplastic resins including polycarbonate resins, silicone modified polycarbonate resins, polystyrene resins, acrylonitrile-butadiene-styrene (ABS) resins, polyphenylene ether resins, polyester resins, polyamide resins, polyethylene, polypropylene, polybutene, polysulfone, polylactic acid, polyvinyl acetate, ethylene-vinyl acetate copolymer, polymethyl methacrylate, polyoxyethylene, cellulose acetate, and cellulose nitrate.

The flame retardant resin composition comprising a polycarbonate resin (A) or a polymer alloy of a polycarbonate resin (A) and a thermoplastic resin (B) other than the polycarbonate resin (A) blended with an additive for imparting flame retardancy with an organic resin (C) comprising a silicone compound having phenyl group bonded to the silicon atom, an alkali metal sulfonate salt group or an alkaline earth metal sulfonate salt group bonded to the silicon atom via a hydrocarbon group (optionally containing a hetero atom), and siloxane bond is particularly useful as a material for producing a molded article having various excellent properties including the excellent flame retardancy.

Examples of the polycarbonate resin used for the component (A) of the flame retardant resin composition of the present invention include a straight chain or branched homopolymer or a copolymer of the thermoplastic aromatic polycarbonate produced by reacting an aromatic dihydroxy compound or a mixture of an aromatic dihydroxy compound and a small amount of polyhydroxy compound with phosgene or a carbonate diester. Exemplary polymerization methods used in producing the polycarbonate resin includes interfacial polycondensation (phosgeneation) and melt polymerization (transesterification).

The aromatic dihydroxy compound used for the starting material include at least one member selected from 2,2-bis (4-hydroxyphenyl)propane (=bisphenol A), tetramethyl-bisphenol A, bis(4-hydroxyphenyl)-p-diisopropylbenzene, hydroquinone, resorcinol, 4,4'-dihydroxy diphenyl, and the like, and the preferred is bisphenol A. In producing a branched aromatic polycarbonate resin a polyhydroxy compound such as phloroglucin, 4,6-dimethyl-2,4,6-tris(4-hydroxyphenyl)-2-heptene, 4,6-dimethyl-2,4,6-tris(4-hydroxyphenyl)heptane, 2,6-dimethyl-2,4,6-tris(4-hydroxyphenyl)-3-heptene, 1,3,5-tris(4-hydroxyphenyl) benzene, or 1,1,1-tris (4-hydroxyphenyl)ethane; or 3,3-bis(4-hydroxyaryl) oxindole (=isatin bisphenol), 5-chloroisatin bisphenol, 5,7-dichloroisatin bisphenol, 5-bromoisatin bisphenol or the like may be used with the aromatic dihydroxy compound as described above. Such compound is preferably used at 0.01 to 10% by mole, and more preferably at 0.1 to 2% by mole in relation to the total amount of the aromatic dihydroxy compound and the polyhydroxy compound.

Molecular weight of the polycarbonate resin can be adjusted in the course of the polycarbonate resin production, and more specifically, by supplying an alkaline aqueous solution of the aromatic dihydroxy compound and a monovalent aromatic hydroxy compound as a chain terminator, and the halogenated carbonyl compound at a predetermined constant molar ratio to the organic solvent in the presence of a polymerization catalyst. Exemplary monovalent aromatic hydroxy compounds used for the chain terminator include m- or p-methyl phenol, m- or p-propyl phenol, p-tert-butylphenol, and long chain alkyl-substituted phenol. Exemplary preferable polycarbonate resin used include a polycarbonate resin derived from 2,2-bis(4-hydroxyphenyl)propane and a polycarbonate copolymer derived from 2,2-bis(4-hydroxyphenyl) propane and another aromatic dihydroxy compound. Alternatively, the resin may be a polymer having siloxane structure, and for example, an oligomer having siloxane structure may be incorporated in order to improve the flame retardancy. The polycarbonate resin may preferably have a molecular weight in the range of 15,000 to 40,000, and more preferably, 16,000 to 30,000 as measured in terms of viscosity average molecular weight calculated from the viscosity of the solution using methylene chloride for the solvent at a temperature of 25° C.

The thermoplastic resin (B) other than the polycarbonate resin used in the flame retardant resin composition of the present invention is not particularly limited as long as it is the one commonly used for producing an article molded from a thermoplastic resin. Examples of typical such thermoplastic resins include silicone modified polycarbonate resin, polystyrene resin, acrylonitrile/butadiene/styrene (ABS) resin, polyphenylene ether resin, polyester resin, and polyamide resin, and also, polyethylene, polypropylene, polybutene, polysulfone, polylactic acid, polyvinyl acetate, ethylene-vinyl acetate copolymer, polymethyl methacrylate, polyoxyethylene, cellulose acetate, and cellulose nitrate. Among such thermoplastic resins, the particularly preferred is the rubber modified styrene/(meth)acrylonitrile graft copolymer produced by polymerizing styrene monomer and (meth)acrylonitrile in the presence of a rubber because such resin is widely used as a polymer alloy with the polycarbonate resin. In the present invention, such copolymer is sometimes referred to as the "rubber modified styrene/(meth)acrylonitrile copolymer". If desired, the "rubber modified styrene/(meth)acrylonitrile copolymer" may be produced by simultaneously polymerizing other compolymerizable monomer with the main styrene monomer, acrylonitrile and/or methacrylonitrile.

Exemplary styrene monomers used for the starting material of the rubber modified styrene/(meth)acrylonitrile copolymer include styrene, α-methylstyrene, p-methylstyrene, and the preferred is styrene. Examples of the (meth) acrylonitrile include acrylonitrile and methacrylonitrile. Other copolymerizable monomers include alkyl (meth)acrylates such as methyl acrylate, ethyl acrylate, propyl acrylate, methyl methacrylate, and ethyl methacrylate, maleimide, and N-phenylmaleimide, and the preferred is the alkyl (meth) acrylate. In the present invention, "(meth)acrylonitrile" means acrylonitrile and/or methacrylonitrile, and "(meth)acryl" means acryl and/or methacryl.

The rubber in the presence of which the polymerization is conducted is preferably a rubber having a glass transition temperature of up to 10° C. Exemplary such rubbers include diene rubbers, acryl rubbers, ethylene/propylene rubbers, and silicone rubbers, and the preferred are diene rubbers and acryl rubbers.

Exemplary diene rubbers include polybutadiene, butadiene/styrene copolymer, polyisoprene, a lower alkyl ester copolymer of butadiene/(meth)acrylic acid, and a lower alkyl ester copolymer of butadiene/styrene/(meth)acrylic acid. Examples of the lower alkyl ester of (meth)acrylic acid include include methyl acrylate, ethyl acrylate, methyl methacrylate, and ethyl methacrylate. Proportion of the lower alkyl ester of (meth)acrylic acid in the lower alkyl ester copolymer of butadiene/(meth)acrylic acid or the lower alkyl ester copolymer of butadiene/styrene/(meth)acrylic acid is preferably up to 30% by weight of the rubber weight.

Exemplary acrylic rubbers include synthetic rubbers produced from an alkyl ester of acrylic acid. The alkyl group constituting the ester is preferably in the range of 1 to 8. Examples of the alkyl acrylate rubber include ethyl acrylate, butyl acrylate, and ethylhexyl acrylate. The alkyl acrylate rubber may optionally contain a crosslinkable ethylenically unsaturated monomer, and the crosslinking agent may be, for example, an alkylenediol, di(meth)acrylate, polyester di(meth)acrylate, divinylbenzene, trivinyl benzene, triallyl cyanurate, allyl (meth)acrylate, butadiene, or isoprene. The acrylic rubber may also be a core-shell type polymer having a crosslinked diene rubber for the core.

In the rubber modified styrene/(meth)acrylonitrile copolymer, content of the styrene monomer is typically 10 to 90% by weight, and preferably 25 to 85% by weight; content of the (meth)acrylonitrile is typically 5 to 40% by weight, and preferably 5 to 25% by weight; and content of the rubber is typically 5 to 80% by weight, and preferably 10 to 50% by weight. Content of other copolymerizable monomers in the rubber modified styrene/(meth)acrylonitrile copolymer is typically up to 20% by weight, and preferably up to 10% by weight.

The method used in the graft polymerization of the styrene monomer and the (meth)acrylonitrile monomer in the presence of a rubber is not particularly limited. The graft polymerization, however, is typically accomplished by emulsion polymerization or mass polymerization. The rubber modified styrene/(meth)acrylonitrile copolymer used in the present invention may be the one produced by either method.

The rubber modified styrene/(meth)acrylonitrile copolymer is typically a graft copolymer in which the rubber has grafted thereto a copolymer of monomers at least including styrene and (meth)acrylonitrile, or a mixture containing a copolymer in which only the monomers are mutually copolymerized. Exemplary such graft copolymers produced by polymerizing the styrene monomer and the (meth)acrylonitrile in the presence of a rubber include ABS resin, AES resin, and AAS resin.

In the resin components of the flame retardant resin composition of the present invention, content of the component (B) is 0 to 50% by weight because inclusion of the component (B) at a content in excess of 50% by weight is likely to invite loss of heat resistance, and the content is preferably 0 to 35% by weight.

In the flame retardant resin composition of the present invention, the component (C), namely, the additive for imparting flame retardancy with an organic resin with an organic resin comprising a silicone compound having phenyl group bonded to the silicon atom, an alkali metal sulfonate salt group or an alkaline earth metal sulfonate salt group bonded to the silicon atom via a hydrocarbon group (optionally containing a hetero atom), and siloxane bond is incorporated at a content of 0.01 to 5.0 parts by weight, preferably at 0.05 to 3.0 parts by weight, and more preferably at 0.1 to 2.0 parts by weight in relation to 100 parts by weight of the resin component comprising 50 to 100% by weight of a polycarbonate resin (A) and 0 to 50% by weight of a thermoplastic resin (B) other than the polycarbonate resin. When the additive for imparting flame retardancy with an organic resin (C) is incorporated at a content of less than 0.01 parts by weight, flame retardancy will be insufficient, and when the content is in excess of 5.0 parts by weight, the resulting composition is likely to experience thermal decomposition detracting from the mechanical strength and the outer appearance.

The flame retardant resin composition of the present invention may also have optionally incorporated therein an additive such as a polyfluoroethylene resin capable of forming fibrils, a silicone compound other than the component (C), a flame retardant known in the art (which is preferably not a halogen flame retardant or a phosphorus flame retardant), an elastomer, a UV absorbent, a phenol antioxidant, a phosphorus thermal stabilizer, a pigment, a dye, a lubricant, a mold releaser, a plasticizer, an antistatic agent, or a slidability improving agent; a reinforcing agent such as glass fiber, glass flake, carbon fiber, or metal fiber; a whisker such as potassium titanate, aluminum borate, or calcium silicate; or an inorganic filler such as mica, talc, or clay at an amount that does not adversely affect the benefits of the present invention. The addition may be accomplished by any method known in the art adequate for realizing the benefit of adding the respective additive component.

The method used in the mixing the components (A) to (C) and other optional components for producing the flame retardant resin composition of the present invention is not particularly limited. For example, the components may be kneaded in a kneading apparatus such as a single screw or multi screw kneader, a Banbury mixer, rolls, or a Brabender plastogram, and cooled for solidification. Alternatively, the components may be added to an appropriate solvent such as a hydrocarbon solvent, for example, hexane, heptane, benzene, toluene, or xylene or derivatives thereof to thereby mix the soluble components in the solvent or mix the soluble and insoluble components in the state of suspension. In the case of melt kneading, the kneading is preferably accomplished by using a single screw or multi screw kneader.

The method used in producing a molded article from the flame retardant resin composition of the present invention is not particularly limited, and any method commonly used with the thermoplastic resin can be employed. Exemplary such methods include moldings such as injection molding, blow molding, extrusion, sheet forming, thermal molding, rotational molding, and lamination.

EXAMPLES

Next, the present invention is described in further detail by referring to the Examples, which are presented to show various embodiments of the present invention, and which by no means limit the scope of the present invention unless the Examples exceed the scope defined in the claims. The Examples and the Comparative Examples were conducted by using the following starting materials.

[Starting Material]
(1) polycarbonate resin: poly-4,4-isopropylidene diphenyl carbonate; product name, Iupilon (Registered Trademark) S-3000 (viscosity average molecular weight, 21,500; manufactured by Mitsubishi Engineering-Plastics Corporation, hereinafter abbreviated as "PC resin").
(2) ABS resin: CBT-698, manufactured by Techno Polymer Co., Ltd.
(3) Additive for imparting flame retardancy with an organic resin according to the present invention comprising a silicone compound having phenyl group bonded to the silicon atom, an alkali metal sulfonate salt group bonded to the silicon atom by an intervening hydrocarbon group, and siloxane bond; Silicone compounds 1 to 4 produced in the Synthesis Examples 1 to 4 as described below.
(4) Silicone compound outside the scope of the present invention not having phenyl group bonded to the silicon atom, and having an alkali metal sulfonate salt group bonded to the silicon atom by an intervening hydrocarbon group and siloxane bond; Silicone compound 5 manufactured in Comparative Synthesis Example 1 as described below; and a silicone compound not containing an alkali metal sulfonate salt group or an alkaline earth metal sulfonate salt group bonded to the silicon atom by an intervening hydrocarbon group, and having phenyl group and siloxane bond bonded to the silicon atom; Silicone compound 6, polymethylphenyl siloxane, product name, KF50, manufactured by Shin-Etsu Chemical Co., Ltd.
(5) Phosphorus flame retardant: triphenyl phosphate manufactured by Daihachi Chemical Industry Co., Ltd. (hereinafter abbreviated as "TPP").
(6) Phenol antioxidant: pentaerythritol tetrakis[3-(3,5-di-tert-butyl-4-hydroxyphenyl)propionate], product name, IRGANOX 1010, manufactured by Ciba Specialty Chemicals (hereinafter abbreviated as "antioxidant").
(7) Thermal stabilizer: tris(2,4-di-tert-butylphenyl)phoshite, product name, ADK STAB 2112, manufactured by ADEKA Corporation (hereinafter abbreviated as "thermal stabilizer").

The silicone compounds obtained in the Synthesis Examples were evaluated for their content of S element and Na element or K element by decomposing the silicone compound with nitric acid and conducing ICP-AES.

Synthesis Example 1

Synthesis of Silicone Compound 1

To a 1.2 L flask equipped with a stirrer, a cooling condenser, a thermometer, and a drop funnel were added 59.5 g (0.3 moles) of phenyltrimethoxysilane, 48.9 g (0.2 moles) of diphenyldimethoxysilane, 58.9 g (0.3 moles) of γ-mercaptopropyltrimethoxysilane, 24.0 g (0.2 moles) of dimethyldimethoxysilane, and 450.0 g of methanol, and the mixture was stirred to prepare a homogeneous solution. To this solution, 30% by weight (119.0 g) of aqueous solution of hydrogen peroxide was added dropwise in 2 hours while maintaining the inner temperature at 20 to 30° C. in a water bath. The solution was stirred for 5 hours for maturing while heating the flask to an inner temperature of 67° C. in refluxing methanol. The reaction solution gradually started to get cloudy in the course of this maturing under reflux, and upon completion of the maturing, the solution was a cloudy homogeneous dispersion. pH of this reaction solution was confirmed to be in the range of 1 to 2 by a pH test paper, and the amount of the hydrogen peroxide remaining in the reaction solution was 0.5 mg/L or less when confirmed by a hydrogen peroxide checker (test paper).

To this reaction solution, 30% by weight (72.6 g) of aqueous solution of potassium hydroxide was added dropwise in 30 minutes while maintaining the inner temperature to the range of 20 to 50° C. in a water bath. The reaction mixture was then stirred for 3 hours while heating the flask to an inner temperature of 67° C. with stirring in refluxing methanol. The pH of the reaction solution was then confirmed to be 9. The reaction mixture was heated in an oil bath at 110° C. to substantially remove methanol and water by distillation, and the reaction mixture was cooled to room temperature. After adding 500 g of methanol again, the reaction mixture was stirred at room temperature for 1 hour, and the resulting homogeneous dispersion was filtered to remove the unreacted content which dissolves in methanol. The content in the form of cake which failed to dissolve in the methanol was added to a mixed solvent of 200 g of methanol and 300 g of ion exchanged water, and the mixture was stirred for 1 hour with cooling in an ice water. The resulting homogeneous dispersion was filtered to remove the remaining ionic impurities. The resulting product in the form of a cake was washed with acetone, and then dried at 100° C. for 5 hours at a reduced pressure of 10 Torr to remove the remaining acetone and water. The resulting product was pulverized in a mortar to obtain 128 g of a fine white powder.

The thus obtained silicone compound 1 has a theoretical structure such that content of the phenyl group in relation to all organic groups bonded to the silicon atom in the molecule is 50% by mole; content of the potassium sulfonate salt group bonded to the silicon atom by the intervening propyl group in relation to all organic groups bonded to the silicon atom in the molecule is 21.4% by mole; it has siloxane bond; content of the branched structure containing trifunctional siloxane unit in all siloxane unit is 60% by mole. When this product was analyzed by nitric acid decomposition and ICP-AES procedure, and content of the S element was 6.1% by weight (theoretical value, 6.1% by weight), content of the K element was 6.9% by weight (theoretical value, 7.5% by weight).

Synthesis Example 2

Synthesis of Silicone Compound 2

The procedure of Synthesis Example 1 was repeated except that the 30% by weight (72.6 g) of aqueous solution of potassium hydroxide was replaced with 30% by weight (45.4 g) of aqueous solution of sodium hydroxide to produce 119 g of fine white powder.

The thus obtained silicone compound 2 has a theoretical structure such that content of the phenyl group in relation to all organic groups bonded to the silicon atom in the molecule is 50% by mole; content of the sodium sulfonate salt group bonded to the silicon atom by the intervening propyl group in relation to all organic groups bonded to the silicon atom in the molecule is 21.4% by mole; it has siloxane bond; content of the branched structure containing trifunctional siloxane unit in all siloxane unit is 60% by mole. When this product was analyzed by nitric acid decomposition and ICP-AES procedure, and content of the S element was 6.5% by weight (theoretical value, 6.3% by weight), content of the Na element was 4.1% by weight (theoretical value, 4.5% by weight).

Synthesis Example 3

Synthesis of Silicone Compound 3

To a 1.2 L flask equipped with a stirrer, a cooling condenser, a thermometer, and a drop funnel were added 99.1 g (0.5 moles) of phenyltrimethoxysilane, 58.6 g (0.24 moles) of diphenyldimethoxysilane, 19.6 g (0.1 moles) of γ-mercaptopropyltrimethoxysilane, 19.2 g (0.16 moles) of dimethyldimethoxysilane, and 580.0 g of methanol, and the mixture was stirred to prepare a homogeneous solution. To this solution, 30% by weight (39.7 g) of aqueous solution of hydrogen peroxide was added dropwise in 2 hours while maintaining the inner temperature at 20 to 30° C. in a water bath. The solution was stirred for 5 hours for maturing while heating the flask to an inner temperature of 67° C. in refluxing methanol. The reaction solution gradually started to get cloudy in the course of this maturing under reflux, and upon completion of the maturing, the solution was a cloudy homogeneous dispersion. pH of this reaction solution was confirmed to be in the range of 2 to 3 by a pH test paper, and the amount of the hydrogen peroxide remaining in the reaction solution was 1 mg/L or less when confirmed by a hydrogen peroxide checker (test paper).

To this reaction solution, 30% by weight (24.2 g) of aqueous solution of potassium hydroxide was added dropwise in 30 minutes while maintaining the inner temperature to the range of 20 to 50° C. in a water bath. The reaction mixture was then stirred for 3 hours while heating the flask to an inner temperature of 67° C. with stirring in refluxing methanol. The pH of the reaction solution was then confirmed to be 8 to 9. The reaction mixture was heated in an oil bath at 110° C. to substantially remove methanol and water by distillation, and the reaction mixture was cooled to room temperature. After adding 500 g of methanol again, the reaction mixture was stirred at room temperature for 1 hour, and the resulting homogeneous dispersion was filtered to remove the unreacted content which dissolves in methanol. The content in the form of cake which failed to dissolve in the methanol was added to a mixed solvent of 200 g of methanol and 300 g of ion exchanged water, and the mixture was stirred for 1 hour with cooling in an ice water. The resulting homogeneous dispersion was filtered to remove the remaining ionic impurities. The resulting product in the form of a cake was washed with acetone, and then dried at 100° C. for 5 hours at a reduced pressure of 10 Torr to remove the remaining acetone and water. The resulting product was pulverized in a mortar to obtain 134 g of a fine white powder.

The thus obtained silicone compound 3 has a theoretical structure such that content of the phenyl group in relation to all organic groups bonded to the silicon atom in the molecule is 70% by mole; content of the potassium sulfonate salt group bonded to the silicon atom by the intervening propyl group in relation to all organic groups bonded to the silicon atom in the molecule is 7.1% by mole; it has siloxane bond; content of the branched structure containing trifunctional siloxane unit in all siloxane unit is 60% by mole. When this product was analyzed by nitric acid decomposition and ICP-AES procedure, and content of the S element was 2.1% by weight (theoretical value, 2.2% by weight), content of the K element was 2.0% by weight (theoretical value, 2.7% by weight).

Synthesis Example 4

Synthesis of Silicone Compound 4

To a 1.2 L flask equipped with a stirrer, a cooling condenser, a thermometer, and a drop funnel were added 69.4 g (0.35 moles) of phenyltrimethoxysilane, 9.8 g (0.04 moles) of diphenyldimethoxysilane, 88.4 g (0.45 moles) of γ-mercaptopropyltrimethoxysilane, 19.2 g (0.16 moles) of dimethyldimethoxysilane, and 600.0 g of methanol, and the mixture was stirred to prepare a homogeneous solution. To this solution, 30% by weight (178.6 g) of aqueous solution of hydrogen peroxide was added dropwise in 2 hours while maintaining the inner temperature at 20 to 30° C. in a water bath. The solution was stirred for 5 hours for maturing while heating the flask to an inner temperature of 67° C. in refluxing methanol. In the course of this maturing under reflux, the reaction solution gradually started to get cloudy from the start of the maturing, and upon completion of the maturing, the solution was a cloudy homogeneous dispersion. pH of this reaction solution was confirmed to be in the range of 1 to 2 by a pH test paper, and the amount of the hydrogen peroxide remaining in the reaction solution was 0.5 mg/L or less when confirmed by a hydrogen peroxide checker (test paper).

To this reaction solution, 30% by weight (108.9 g) of aqueous solution of potassium hydroxide was added dropwise in 30 minutes while maintaining the inner temperature to the range of 20 to 50° C. in a water bath. The reaction mixture was then stirred for 3 hours while heating the flask to an inner temperature of 67° C. with stirring in refluxing methanol. The pH of the reaction solution was then confirmed to be 9 to 10. The reaction mixture was heated in an oil bath at 110° C. to substantially remove methanol and water by distillation, and the reaction mixture was cooled to room temperature. After adding 600 g of methanol again, the reaction mixture was stirred at room temperature for 1 hour, and the resulting homogeneous dispersion was filtered to remove the unreacted content which dissolves in methanol. The content in the form of cake which failed to dissolve in the methanol was added to a mixed solvent of 400 g of methanol and 300 g of ion exchanged water, and the mixture was stirred for 1 hour with cooling in an ice water. The resulting homogeneous dispersion was filtered to remove the remaining ionic impurities. The resulting product in the form of a cake was washed with acetone, and then dried at 100° C. for 5 hours at a reduced pressure of 10 Torr to remove the remaining acetone and water. The resulting product was pulverized in a mortar to obtain 111 g of a fine white powder.

The thus obtained silicone compound 4 has a theoretical structure such that content of the phenyl group in relation to all organic groups bonded to the silicon atom in the molecule is 35.8% by mole; content of the potassium sulfonate salt group bonded to the silicon atom by the intervening propyl group in relation to all organic groups bonded to the silicon atom in the molecule is 37.5% by mole; it has siloxane bond; content of the branched structure containing trifunctional siloxane unit in all siloxane unit is 80% by mole. When this product was analyzed by nitric acid decomposition and ICP-AES procedure, and content of the S element was 9.1% by weight (theoretical value, 9.0% by weight), content of the K element was 9.7% by weight (theoretical value, 11.0% by weight).

Comparative Synthesis Example 1

Synthesis of Silicone Compound 5 (for Comparison Purpose)

To a 1.2 L flask equipped with a stirrer, a cooling condenser, a thermometer, and a drop funnel were added 40.9 g (0.3 moles) of methyltrimethoxysilane, 58.9 g (0.3 moles) of γ-mercaptopropyltrimethoxysilane, 48.1 g (0.4 moles) of dimethyldimethoxysilane, and 400.0 g of methanol, and the mixture was stirred to prepare a homogeneous solution. To this solution, 30% by weight (119.0 g) of aqueous solution of hydrogen peroxide was added dropwise in 2 hours while maintaining the inner temperature at 20 to 30° C. in a water bath. The solution was stirred for 5 hours for maturing while heating the flask to an inner temperature of 67° C. in refluxing methanol. The reaction solution gradually started to get cloudy in the course of this maturing under reflux, and upon completion of the maturing, the solution was a cloudy homogeneous dispersion. pH of this reaction solution was confirmed to be in the range of 1 to 2 by a pH test paper, and the amount of the hydrogen peroxide remaining in the reaction solution was 0.5 mg/L or less when confirmed by a hydrogen peroxide checker (test paper).

To this reaction solution, 30% by weight (72.6 g) of aqueous solution of potassium hydroxide was added dropwise in 30 minutes while maintaining the inner temperature to the range of 20 to 50° C. in a water bath. The reaction mixture was then stirred for 3 hours while heating the flask to an inner temperature of 67° C. with stirring in refluxing methanol. The pH of the reaction solution was then confirmed to be 9. The reaction mixture was heated in an oil bath at 110° C. to substantially remove methanol and water by distillation, and the reaction mixture was cooled to room temperature. After adding 500 g of methanol again, the reaction mixture was stirred at room temperature for 1 hour, and the resulting homogeneous dispersion was filtered to remove the unreacted content which dissolves in methanol. The content in the form of cake which failed to dissolve in the methanol was added to a mixed solvent of 200 g of methanol and 300 g of ion exchanged water, and the mixture was stirred for 1 hour with cooling in an ice water. The resulting homogeneous dispersion was filtered to remove the remaining ionic impurities. The resulting product in the form of a cake was washed with acetone, and then dried at 100° C. for 5 hours at a reduced pressure of 10 Torr to remove the remaining acetone and water. The resulting product was pulverized in a mortar to obtain 83 g of a fine white powder.

The thus obtained silicone compound 5 has a theoretical structure such that content of the phenyl group in relation to all organic groups bonded to the silicon atom in the molecule is 0% by mole; content of the potassium sulfonate salt group bonded to the silicon atom by the intervening propyl group in relation to all organic groups bonded to the silicon atom in the molecule is 21.4% by mole; it has siloxane bond; content of the branched structure containing trifunctional siloxane unit in all siloxane unit is 60% by mole. When this product was analyzed by nitric acid decomposition and ICP-AES procedure, content of the S element was 8.8% by weight (theoretical value, 8.5% by weight), and content of the K element was 6.5% by weight (theoretical value, 10.3% by weight).

Examples 1 to 7 and Comparative Examples 1 to 7

The components were blended by the formulation as shown in Tables 1 and 2, and the mixture was kneaded and pelletized in a single shaft extruder VS-40 (manufactured by Tanabe Plastic) at a barrel temperature of 260° C. The resulting pellets were dried at 120° C. (110° C. in the case of ABS resin) for 5 hours, and injection molded by using Sicap M-2 manufactured by Sumitomo Heavy Industries, Ltd. under the conditions including a clamping force of 75T, a cylinder temperature of 270° C. (260° C. in the case of ABS resin), and a mold temperature of 100° C. to produce test pieces at a cycle of 60 seconds. The resulting test pieces were evaluated by the procedure as described below. The results are shown in Tables 1 and 2. As evident from the comparison of the results shown in Tables 1 and 2, the flame retardant resin compositions of the present invention were superior in flame retardancy, Izod impact strength, total light transmittance (transparency/resin system containing PC resin), outer appearance of the molded article (resin system containing ABS resin), and resistance to mold deposit (resin system containing ABS resin).

[Evaluation of Test Piece]
(1) Flammability: Burn test was conducted according to UL94 vertical burn test for a test piece having a thickness of 2.0 mm.
(2) Izod impact strength: Measurement was conducted according to ASTM D256.
(3) Light transmission: Total light transmission was measured according to ASTM D1003 by molding a plate of 80 mm×40 mm×3.2 mm (evaluation was conducted only for the resin system containing PC resin).
(4) Outer appearance of molded article: The area near the gate of a test piece for tensile strength with no weld portion was visually inspected. A test piece with no flow mark was evaluated A, a test piece with few flow marks was evaluated B, and a test piece with flow marks was evaluated C (evaluation was conducted only for the resin system containing ABS resin).
(5) Mold deposit: Continuous molding was conducted for 500 shots under the conditions described in the Examples, and after the completion of the molding, the molded article was evaluated for the presence of the mold deposit (evaluation was conducted only for the resin system containing ABS resin).

TABLE 1

| | | Example | | | | | | |
|---|---|---|---|---|---|---|---|---|
| | | 1 | 2 | 3 | 4 | 5 | 6 | 7 |
| Composition (parts by weight) | PC resin | 100 | 100 | 100 | 100 | 100 | 90 | 80 |
| | ABS resin | | | | | | 10 | 20 |
| | Silicone compound 1 | 0.5 | 1 | | | | 1 | 2 |
| | Silicone compound 2 | | | 1 | | | | |
| | Silicone compound 3 | | | | 2 | | | |
| | Silicone compound 4 | | | | | 1 | | |

TABLE 1-continued

| | | Example | | | | | | |
|---|---|---|---|---|---|---|---|---|
| | | 1 | 2 | 3 | 4 | 5 | 6 | 7 |
| | Silicone compound 5 | | | | | | | |
| | Silicone compound 6 | | | | | | | |
| | TPP | | | | | | | |
| | Antioxidant | 0.02 | 0.02 | 0.02 | 0.05 | 0.02 | 0.02 | 0.05 |
| | Thermal stabilizer | 0.02 | 0.02 | 0.02 | 0.05 | 0.02 | 0.02 | 0.05 |
| Performance | Flammability: UL94 | V-1 | V-0 | V-1 | V-0 | V-0 | V-0 | V-1 |
| | Impact strength: J/m | 720 | 690 | 700 | 700 | 660 | 560 | 510 |
| | Total light transmittance: % | 91 | 88 | 87 | 90 | 85 | — | — |
| | Outer appearance of molded article | — | — | — | — | — | A | A |
| | Mold deposit | — | — | — | — | — | No | No |

TABLE 2

| | | Comparative Example | | | | | | |
|---|---|---|---|---|---|---|---|---|
| | | 1 | 2 | 3 | 4 | 5 | 6 | 7 |
| Composition (parts by weight) | PC resin | 100 | 100 | 100 | 100 | 100 | 90 | 90 |
| | ABS resin | | | | | | 10 | 10 |
| | Silicone compound 1 | | | | | 6 | | 6 |
| | Silicone compound 2 | | | | | | | |
| | Silicone compound 3 | | | | | | | |
| | Silicone compound 4 | | | | | | | |
| | Silicone compound 5 | | | | 1 | | | |
| | Silicone compound 6 | | | | | 1 | | |
| | TPP | | 5 | | | | 5 | |
| | Antioxidant | 0.02 | 0.02 | 0.02 | 0.02 | 0.05 | 0.02 | 0.05 |
| | Thermal stabilizer | 0.02 | 0.02 | 0.02 | 0.02 | 0.05 | 0.02 | 0.05 |
| Performance | Flammability: UL94 | HB | V-2 | V-2 | V-2 | V-2 | NG | V-2 |
| | Impact strength: J/m | 720 | 250 | 570 | 680 | 120 | 520 | 350 |
| | Total light transmittance: % | 92 | 90 | 63 | 84 | 54 | — | — |
| | Outer appearance of molded article | — | — | — | — | — | C | B |
| | Mold deposit | — | — | — | — | — | Yes | No |

Japanese Patent Application No. 2006-157082 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An additive for imparting flame retardancy with an organic resin comprising a silicone compound having phenyl group bonded to silicon atom, an alkali metal sulfonate salt group or an alkaline earth metal sulfonate salt group bonded to silicon atom via a hydrocarbon group (optionally containing a hetero atom), and siloxane bond.

2. The additive for imparting flame retardancy with an organic resin according to claim 1 wherein the silicone compound has a branched structure.

3. The additive for imparting flame retardancy with an organic resin according to claim 1 wherein the alkali metal sulfonate salt group or the alkaline earth metal sulfonate salt group in the silicone compound is sodium sulfonate salt group or potassium sulfonate salt group.

4. A flame retardant resin composition comprising 100 parts by weight of a resin comprising 50 to 100% by weight of a polycarbonate resin (A) and 0 to 50% by weight of a thermoplastic resin (B) other than the polycarbonate resin; and 0.01 to 5.0 parts by weight of the additive for imparting flame retardancy with an organic resin (C) of claim 1.

5. The flame retardant resin composition according to claim 4 wherein the thermoplastic resin (B) other than the polycarbonate resin is a rubber-modified styrene/(meth)acrylonitrile graft copolymer produced by polymerizing at least a styrene monomer and (meth)acrylonitrile in the presence of a rubber.

6. An article produced by molding the flame retardant resin composition of claim 4.

7. The flame retardant resin composition of claim 4, wherein the polycarbonate resin (A) is a straight chain or branched homopolymer or a copolymer of a thermoplastic aromatic polycarbonate produced by reacting an aromatic dihydroxy compound or a mixture of an aromatic dihydroxy compound and a small amount of polyhydroxy compound with phosgene or a carbonate diester.

8. The flame retardant resin composition according to claim 4, wherein the content of thermoplastic resin (B) is 0 to 35% by weight.

9. The flame retardant resin composition according to claim 4, wherein the content of the additive for imparting flame retardancy (C) is 0.1 to 2.0 parts by weight in relation to 100 parts by weight of components (A) and (B) combined.

10. The additive for imparting flame retardancy of claim 1, wherein said silicone compound additive has: a phenyl group content in relation to all organic groups bonded to the silicon atom in the molecule of 50% by mole; a content of a potassium sulfonate salt group bonded to the silicon atom by the intervening propyl group in relation to all organic groups bonded to the silicon atom in the molecule of 21.4% by mole; a siloxane bond; a content of a branched structure-containing trifunctional siloxane unit in all siloxane units of 60% by mole; and a potassium content of 6.9 weight-%.

11. The additive for imparting flame retardancy of claim 1, wherein said silicone compound additive has: a phenyl group content in relation to all organic groups bonded to the silicon atom in the molecule of 50% by mole; a content of a sodium sulfonate salt group bonded to the silicon atom by the intervening propyl group in relation to all organic groups bonded to the silicon atom in the molecule of 21.4% by mole; a siloxane bond; a content of a branched structure-containing trifunctional siloxane unit in all siloxane units of 60% by mole; and a sodium content of 4.1 weight-%.

12. The additive for imparting flame retardancy of claim 1, wherein said silicone compound additive has: a phenyl group content in relation to all organic groups bonded to the silicon atom in the molecule of 70% by mole; a content of a potassium sulfonate salt group bonded to the silicon atom by the intervening propyl group in relation to all organic groups bonded to the silicon atom in the molecule of 7.1% by mole; a siloxane bond; a content of a branched structure-containing trifunctional siloxane unit in all siloxane units of 60% by mole; and a potassium content of 2.0 weight-%.

13. The additive for imparting flame retardancy of claim 1, wherein said silicone compound additive has: a phenyl group content in relation to all organic groups bonded to the silicon atom in the molecule of 35.8% by mole; a content of a potassium sulfonate salt group bonded to the silicon atom by the intervening propyl group in relation to all organic groups bonded to the silicon atom in the molecule of 37.5% by mole; a siloxane bond; a content of a branched structure-containing trifunctional siloxane unit in all siloxane units of 80% by mole; and a potassium content of 9.7 weight-%.

* * * * *